United States Patent [19]

Greenwell

[11] 3,909,168

[45] Sept. 30, 1975

[54] INJECTION TUBE ASSEMBLY AND CONCRETE PANEL FORM

[76] Inventor: Joseph L. Greenwell, 8320 S.W. 151st St., Kendall, Fla. 33158

[22] Filed: Mar. 18, 1974

[21] Appl. No.: 452,054

Related U.S. Application Data

[63] Continuation of Ser. No. 235,306, March 16, 1972, abandoned.

[52] U.S. Cl. ............... 425/129; 249/53; 425/432; 425/449
[51] Int. Cl.² .................................... B28B 13/02
[58] Field of Search ............ 425/110, 117, 129–130, 425/242, 256–258, 432, 447, 449, 456; 249/53, 106, 108, 15–16, 18, 33; 222/478, 485

[56] References Cited
UNITED STATES PATENTS

| | | | |
|---|---|---|---|
| 1,394,997 | 10/1921 | Lake | 264/35 |
| 2,256,660 | 9/1941 | Watts | 222/485 |
| 2,262,899 | 11/1941 | Mechlin | 264/35 |
| 2,533,986 | 12/1950 | Atterbury | 425/447 |
| 3,000,070 | 9/1961 | Gagne | 425/352 |
| 3,438,161 | 4/1969 | Koch | 264/35 |
| 3,551,947 | 1/1971 | Jennings | 425/130 |
| 3,563,523 | 2/1971 | Wendt, Jr. | 425/432 |

*Primary Examiner*—Robert D. Baldwin
*Assistant Examiner*—John McQuade
*Attorney, Agent, or Firm*—Ronald E. Barry

[57] ABSTRACT

An apparatus and method for molding building structures, the apparatus including an injector assembly having a manifold and a plurality of injector tubes for injecting a plastic composition containing a granular material and a binder into a mold, a plurality of void forming members supported at predetermined intervals within the mold on a wire screen, the injector tubes being spaced at intervals corresponding to the intervals between the void forming members, a number of vibrators mounted on the mold to vibrate the mold as the premixed composition is injected into the injector assembly, the assembly being raised at a rate sufficient to maintain a predetermined head at the injector tube outlets and a vibrator mounted on said assembly to maintain an even flow of the plastic composition through the injector tubes and to increase the density of composition in the mold. The method includes the steps in injecting or pumping a plastic composition containing a granular material and a binder into an injector tube assembly having a plurality of injector tubes disposed between void forming members supported within a mold, raising the injector tube assembly at a rate sufficient to maintain a predetermined head at the injector tube outlets and continuously vibrating the mold and injector tube assembly to assure uniform density and even flow of the plastic composition into the mold and allows sufficient time for the plastic composition to set.

6 Claims, 11 Drawing Figures

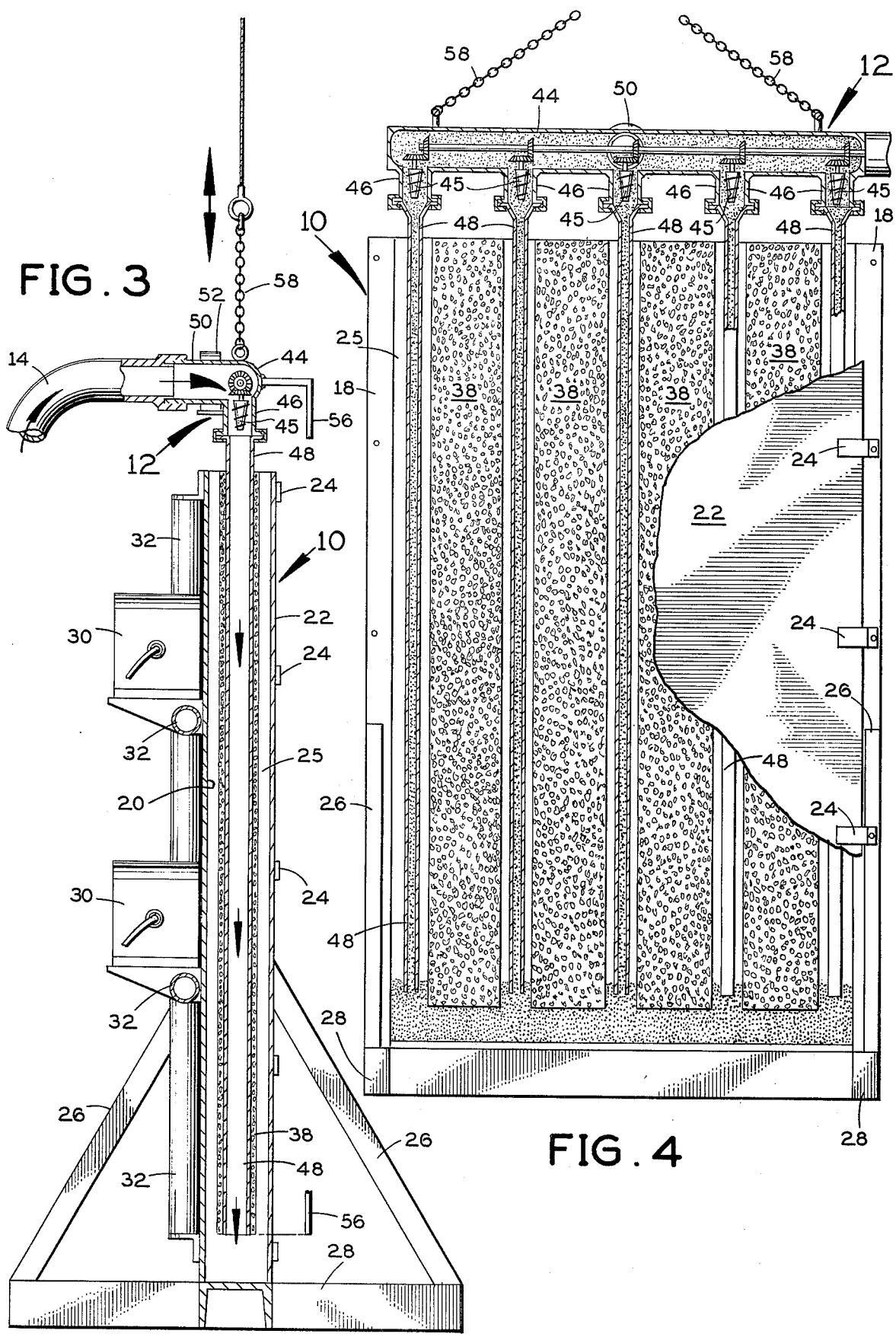

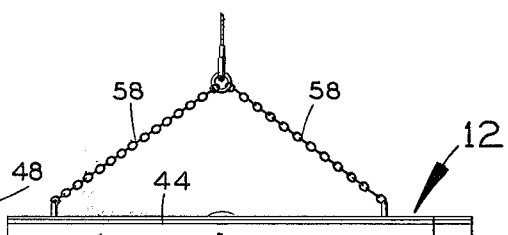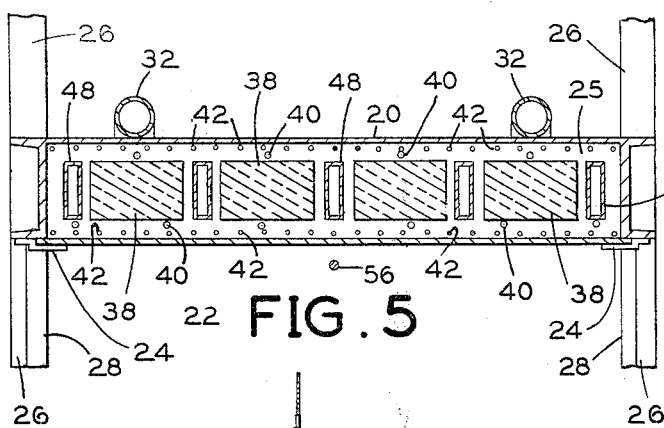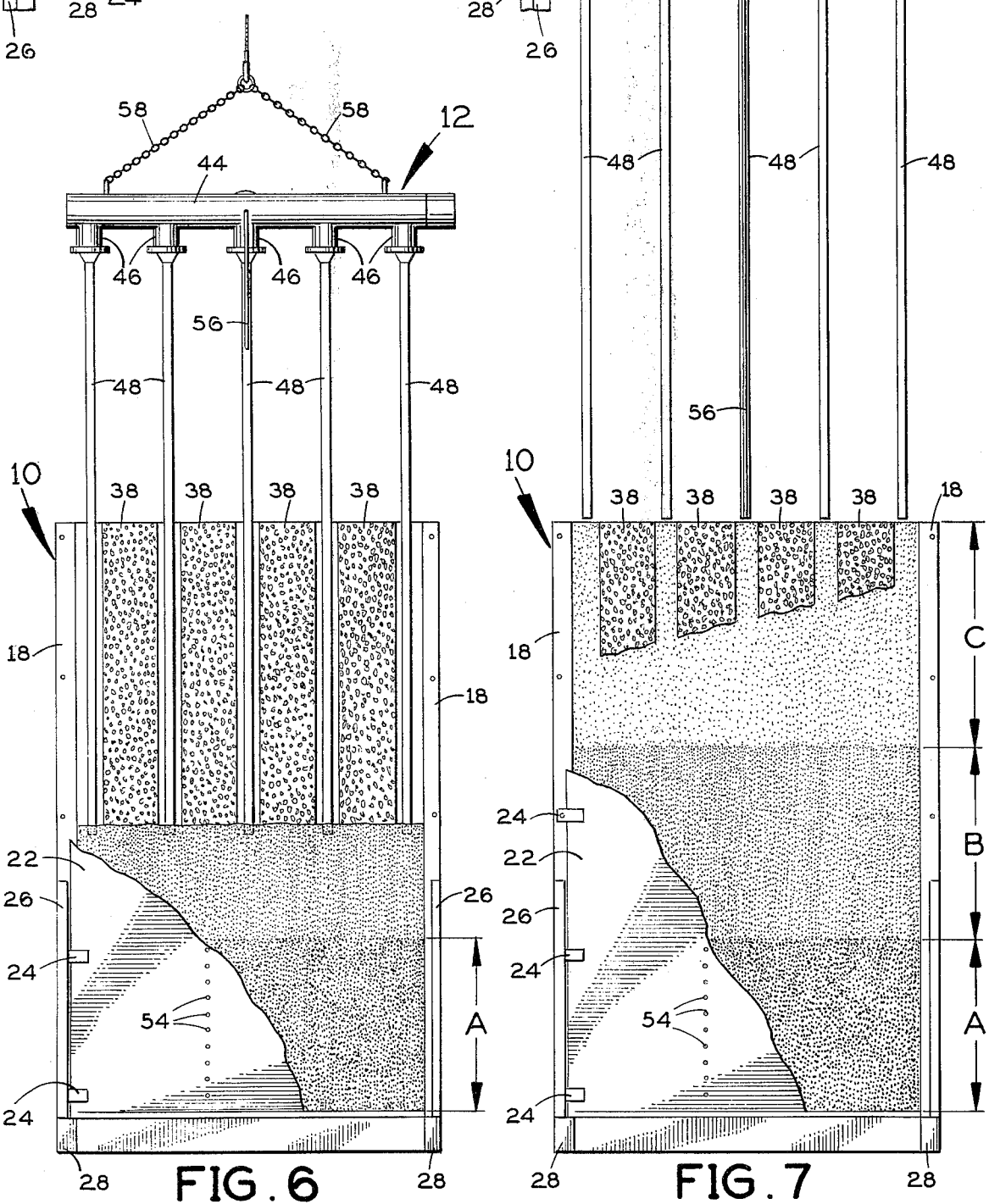

INJECTION TUBE ASSEMBLY AND CONCRETE PANEL FORM

This application is a continuation of Ser. No. 235,306 filed on Mar. 16, 1972 now abandoned.

BACKGROUND OF THE INVENTION

Building walls have previously been formed by pouring cement into a horizontally positioned mold or form. This often involves a number of steps including the step of initially pouring a layer of cement into the mold, positioning reinforcing wires on the initial layer of cement and filling the form with cement. A cement wall and method as described above is shown in the co-pending application of Chang, Ser. No. 132,360, filed Apr. 4, 1971, and entitled "Dual Parallel Spaced Ferrocement Panel with Reinforcing Transverse Webs." Although the wall formed by such a method has been found to be satisfactory for its intended use, the method is limited to a flat shaped wall and the time required to make the wall has made the cost of a building structure formed by such walls excessive.

SUMMARY OF THE INVENTION

The apparatus of the present invention provides a building structure which can be formed in a single operation. The apparatus includes an injector assembly having a plurality of injector tubes which depend from a manifold to the bottom of a mold cavity. A premixed composition is pumped into the manifold and is injected through the injector tubes into the bottom of the mold cavity. Void forming members supported on a screen or wire can be positioned within the mold cavity to reduce the weight of the wall and increase the insulating characteristics of the wall. Uniformity of distribution or density of the composition is maintained by raising the injector tube assembly at a rate sufficient to maintain a predetermined head at the outlet of the injector tubes. The mold and assembly are continuously vibrated during the injection operation to provide for the complete distribution of the premixed composition throughout the mold cavity and to increase the density of the composition.

DRAWINGS

FIG. 3 is a side elevation view taken on line 3—3 of FIG. 1, showing one of the injector tubes within the mold cavity;

FIG. 4 is a front elevation view of the mold with the removable wall broken away to show the location of the injector tubes in the spaces between void forming members;

FIG. 5 is a top view taken on line 5—5 of FIG. 1, showing the position of the injector tubes in the spaces between the void forming members;

FIG. 6 is a view similar to FIG. 4, showing the injector tube assembly raised to a position corresponding to the height of the composition in the mold;

FIG. 7 is a view similar to FIG. 6, showing the injector tube assembly raised to a position above the mold;

DESCRIPTION OF THE INVENTION

Figure 1:
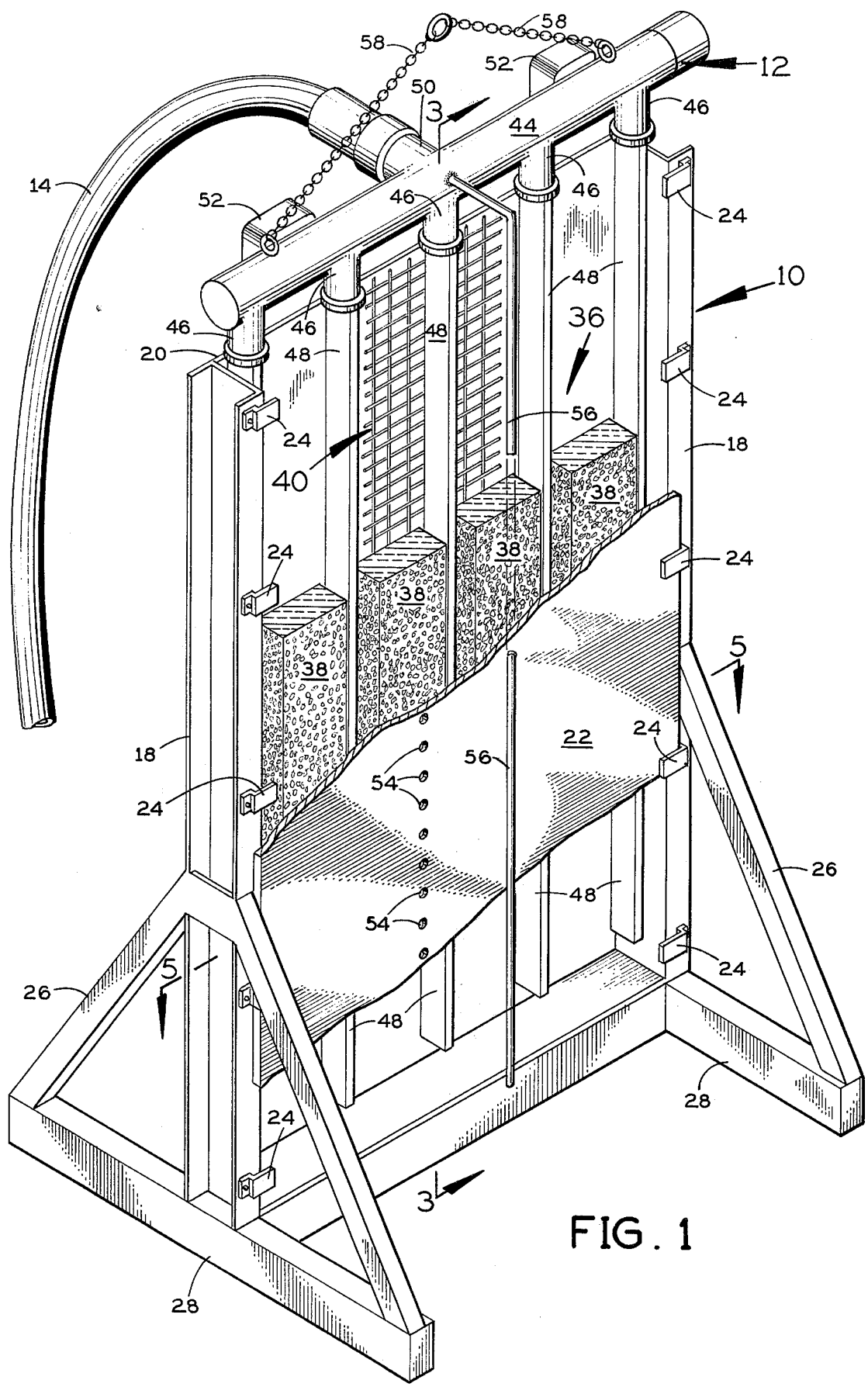
FIG. 1 is a perspective view of the front of the apparatus of this invention with a portion of the removable wall of the mold broken away to show the position of the void forming members in the mold cavity.
Figure 2:
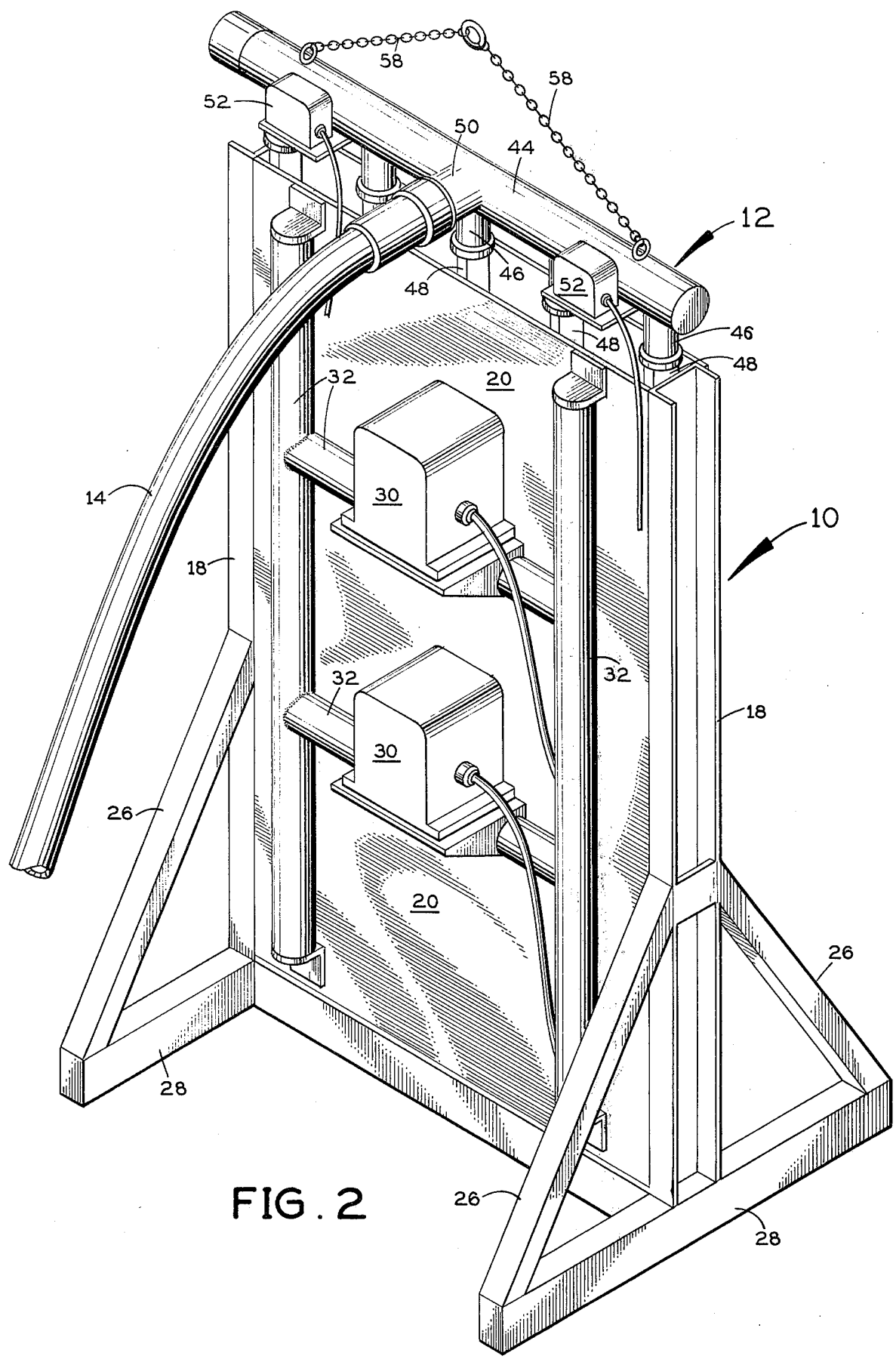
FIG. 2 is a perspective view of the back of the apparatus showing vibrators mounted on the back wall of the mold.

The apparatus of the present invention generally includes a mold 10 and an injector tube assembly 12. The mold 10 is supported in a vertical position and has an open top for injection of a premixed composition into the mold. The injector tube assembly 12 is initially suspended partially in the mold and is raised as the level of the composition rises in the mold. The premixed composition is pumped into the injector tube assembly 12 through a hose or tube 14 from a pump or the like (not shown). As the composition flows through the injector tube assembly 12 to the bottom of the mold cavity, the level of the composition will rise above the outlets from the injector tube assembly. The injector tube assembly 12 is raised at a rate sufficient to maintain the outlets of the injector tubes on the injector tube assembly below the level of the composition in the mold.

In the present invention a plastic composition is injected into the mold and is allowed to set in the mold to form the building structure. Plastic as used herein, refers to the flow characteristic of the composition. This composition generally contains a major amount of granular material such as sand and a minor amount of a binder such as Portland Cement or a liquid binder such as polyethylene or polypropylene. A composition which has been used successfully in this type of injection molding apparatus is described in the Chang application, Ser. No. 132,360, referred to above. The composition disclosed therein is described generally as containing 2 parts sand to 1 part cement or 3 parts sand to 1 part cement. A fine silica sand, grades 10-150, and a Portland cement, grades 1 through 3, is preferred. Sufficient water is added as is generally understood in mixing cement. This composition has practically zero slump and must be pumped under pressure to the injector assembly 12. A composition of this type has poor flow characteristics and high hydrostatic forces will build up in the mold if the injector tubes are allowed to remain in a fixed position near the bottom of the mold. By moving the injector assembly out of the mold, the hydrostatic forces in the mold are kept to a minimum. The mold can then be made of light weight materials and does not require any reinforcing.

The Mold (FIGS. 1 through 5)

More particularly, the mold 10 includes a bottom wall or barrier 16, end walls or barriers 18 and a back panel 20. The bottom wall 16 and end walls 18 are shown formed from channel members with the end walls secured to the ends of the bottom wall 16. The back panel 20 is secured to the edges of the channel members along one side of the bottom wall 16 and the end walls 18. The front of the mold is closed to form a mold cavity 25 by means of a front panel 22 removably supported on the front of the end walls 18 by means of offset brackets 24 provided on the front side of the channel members for the end walls 18. The mold is supported in a vertical position by means of braces 26 connected to the ends of transverse support members 28 provided on the ends of the bottom wall 16.

The mold 10 is vibrated while the composition is being injected into the mold cavity by means of a number of vibrators 30 secured to the mold 10. The vibrators are shown mounted on cross braces 32 on the back panel 20. However, the vibrators can be mounted at different locations as desired. The vibrators can be pneumatic, hydraulic or electrically driven, depending on the type of power available. The vibrators are normally started after the composition has started to fill the bottom of the mold cavity.

Figure 11:
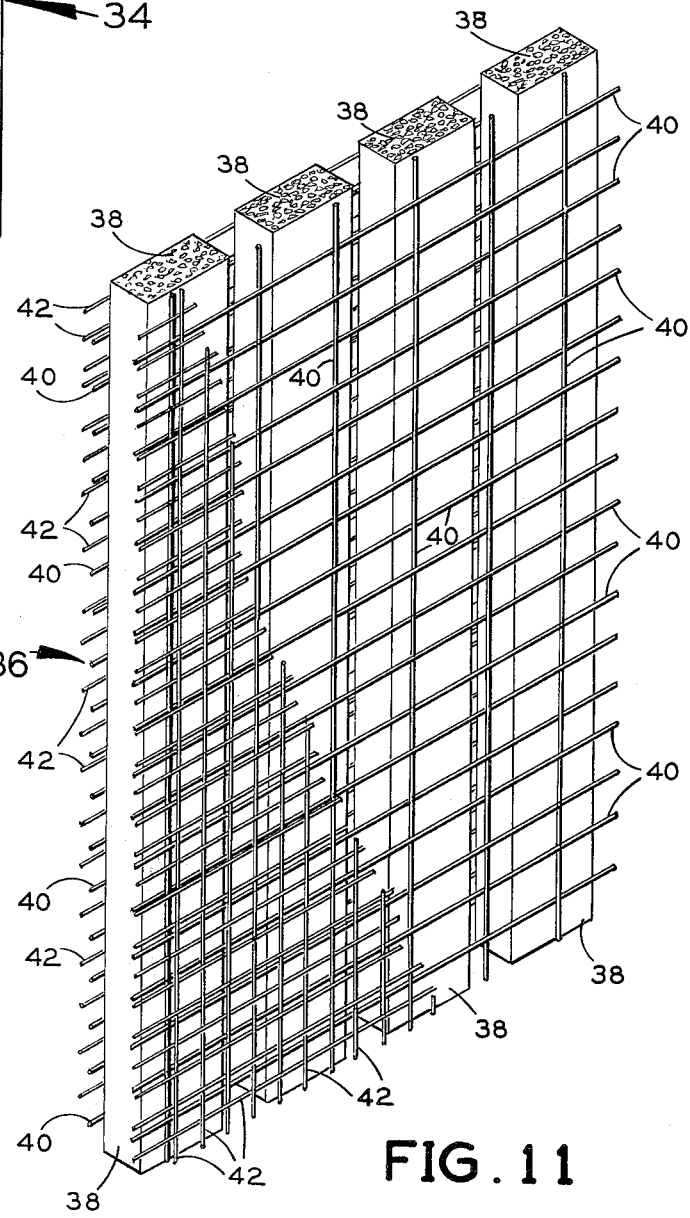
FIG. 11 is a perspective view of the laminated core which is provided in the mold.

The Core (FIG. 11)

The building structure 34 formed by the apparatus of this invention is monolithic in form and can be strengthened by means of a laminated core 36. The core 36 not only provides strength to the wall but also provides voids in the wall to increase the insulating characteristics of the wall and also to reduce the weight of the wall. The wall molded by using the core 36 is in the form of a sandwich having two high tensile strength skins 35 separated by webs 37. In this regard, the core 36 includes a number of void forming members 38 and two pair of screens 40 and 42 mounted on and separated by the members 38. The members 38 can be completely embedded in the wall or removed from the wall if desired. The members 38 are shown in the form of blocks made from a cellular plastic material such as polystyrene or cardboard or removable steel void formers.

The strength of the wall is increased by means of the two pairs of wire screens 40 and 42 provided on each side of the members 38. The inner pair of screens 40 are shown in the form of a reinforced 10 gauge wire mesh having 6 inch × 10 inch openings. The outer pair of screens 42 are shown in the form of a 14 gauge hardware cloth having ½ inch × ½ inch openings. The members 38 are connected in a parallel spaced relation between the wire screens 40 and 42 to form insulating voids in the wall. The screens 40 should be placed adjacent to the surfaces of the blocks with the screen 42 secured to the outside surface of the screen 40. The screen 40 provides sufficient space between the block 38 and the screen 42 to allow the cement to completely surround the hardware cloth 42.

The laminated core is positioned within the cavity 25 of the mold 10 with the insulating blocks 38 positioned in a generally vertical relation. When the cavity 25 is filled with the compositon as described hereinafter, a high tensile strength skin 35 will be formed on each side of the blocks 38 with the skins 35 connected by webs 37 formed in the spaces between the blocks 38. The strength of the web 37 can be increased by using cross wire or ties in the webs or by positioning reinforcing rods in the webs.

The Injector Tube Assembly (FIGS. 1, 3, 4 and 7)

The injector tube assembly 12 includes a manifold 44 having a number of outlet tubes 46 spaced at intervals along the bottom of the manifold a distance corresponding to the distance between the web spaces between members 38 in the core 36. The composition pumped into the manifold 44 is injected into the cavity 25 in the mold by means of injector tubes 48 secured to the outlet tubes 46. The injector tubes 48 have a generally rectangular configuration which conforms to the shape of the web spaces between the members 38 in the core 36 to provide an unobstructed flow path for the composition. It should be noted that the manifold 44 has a length substantially equal to the length of the mold 10 and the injector tubes 48 having a length substantially equal to the height of the mold 10. The manifold 44 is connected to the hose 14 by means of an inlet pipe 50. Although only a single inlet pipe is shown, it may be desirable to add additional inlet pipes to the manifold if the length of the manifold is increased to a length where the composition will not flow freely to all parts of the manifold.

Means are provided to vibrate the assembly 12 as the composition is pumped through the manifold 44. Such means is in the form of a number of vibrators 52 mounted on the manifold 44. The vibrators can be driven by any available power source and should have a high vibration rate with a low amplitude of vibration. In the present embodiment of the invention, vibrators having 5,000 to 6,000 vpm are being used. If desired, means can be provided for positively moving the plastic composition into the tubes 48. Such means can be in the form of augers 45 positioned in the outlet tubes 46 and extending into the manifold 44. The augers can be driven by any appropriate means to assure flow into the tubes 48.

The injector tube assembly 12 is elevated at a rate corresponding to the flow rate of the composition being injected into the cavity in the mold to maintain a predetermined head at the end of the injector tubes 48. In this regard, it has been determined that the density and rate of flow of the composition is maintained uniform, by maintaining the ends of the injector tubes at a depth of at least 1 inch to 1-½ inches below the level of the composition in the mold cavity. It should be noted that an uneven distribution of the composition to the injector tubes can result in an uneven distribution of the composition in the mold. By noting the level of the composition in the mold at points where slower delivery is contemplated, the injector tube assembly 12 can be raised at a rate sufficient to maintain the ends of the injector tubes at the level of the composition at the point where the flow will be slowest.

Means can be provided for observing the level of the composition in the mold 10 as well as the end of the injector tubes 48. Such means is in the form of a series of holes 54 provided in one of the panels 20 or 22 and a gauge stick or rod 56 connected to the manifold 44 and depending from the manifold downward on the outside of the mold. The end of the rod 56 should be located at approximately the same point as the end of the injector tubes 48. As the composition rises in the mold 10 a small amount of the composition will flow out through the holes 54 indicating the level of the composition in the mold at that point. By observing the level of the composition in the holes and maintaining the composition indicated at the holes 54 the rate of withdrawal of the injector assembly can be governed to control fill and density.

Operation

In operating the apparatus of this invention and referring to FIGS. 4 through 7, it will be noted that the injector tube assembly 12 is initially suspended above the mold 10 by means of a chain 48 with the injector tubes 48 positioned in the spaces between the members 38 in the core 36. The ends of the injector tubes 48 will initially be spaced a distance above the bottom wall 16. The air setting composition is pumped through the hose 14, inlet pipe 50, and manifold 44 for distribution to the injector tubes 48. The vibrators 52 on the manifold 44 are actuated as soon as the composition starts to flow through the injector tubes 48 and the vibrators 30 on the mold 10 are started after the composition starts to fill cavity 25. The composition, after entering the manifold 44, flows under pressure through the injector tubes 48 to the bottom wall 16 of the mold. As the composition begins to rise in the bottom of the cavity in the mold, the injector tube assembly 12 is raised as shown in FIGS. 6 and 7 at a rate sufficient to maintain the ends of the injector tubes 48 below the level of the composition in the mold. The composition will flow around the void forming members 38 completely embedding the members 38 and the wire screens 40 and 42 within the wall. The continuous vibration of the mold and injector tube assembly 12 assures a uniform distribution of the composition around the insulating blocks 38 and the spaces between the blocks 38.

A Preformed Monolithic Cement Wall

Figure 10:
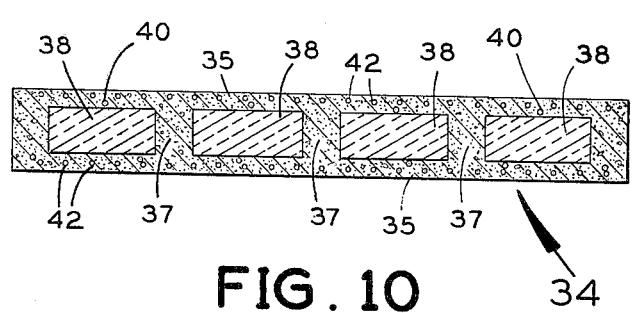
FIG. 10 is taken on line 10—10 of FIG. 8, showing a cross sectional view of the wall formed by the apparatus of this invention.
Figure 8:
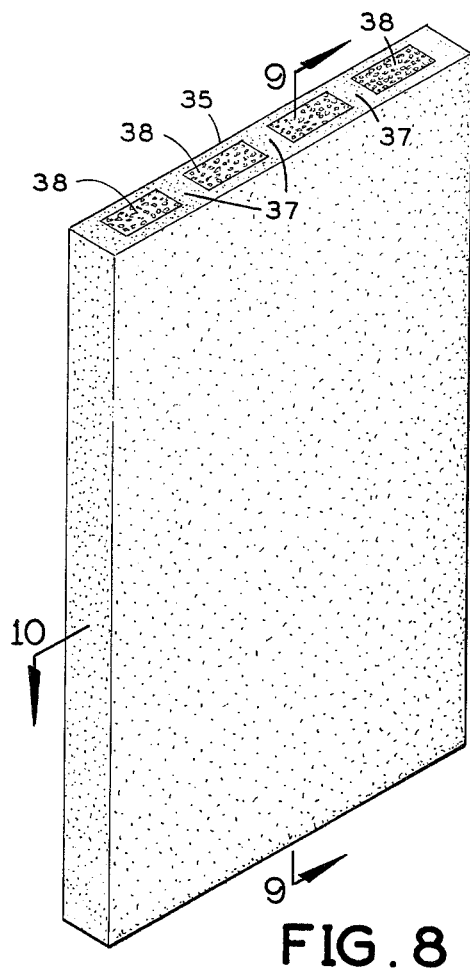
FIG. 8 is a perspective view of a wall formed by the apparatus of the present invention.
Figure 9:
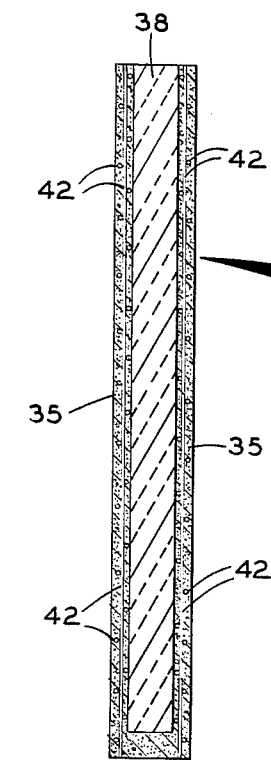
FIG. 9 is a side elevational view taken on line 9—9 of FIG. 8, showing a cross sectional view of the wall formed by the present invention.

The wall 34 formed by the apparatus of this invention is shown in FIGS. 8, 9 and 10. Although only a small section of the wall is shown, it should be understood that a single wall 8 feet high, 48 to 60 feet long and four to 6 inches thick is contemplated. The void forming members 38 in a wall of this size should be approximately 3 inches thick and 12 to 14 inches wide. The blocks 38 are spaced approximately 2 inches apart. When the wall 34 is completed, the webs 37 provided in the spaces between the members 38 form a connection between the reinforced walls formed on each side of the blocks 38.

I claim:

1. An apparatus for injection molding a monolithic building wall 4 to 6 inches thick and up to 60 feet long, said apparatus comprising:

a vertical mold having a bottom wall, end walls, and side walls and being open at the top, said walls defining the surfaces of said building wall, a core positioned in said mold, said core including a number of cellular plastic members approximately three inches thick mounted in a vertical relation within said mold, a continuous screen mounted on and connected to each side of said members to support said members in a parallel spaced relation within said mold, and an injector tube assembly supported for vertical movement into and out of said opening in the mold, said assembly including a manifold and a number of injector tubes connected to said manifold in a spaced relation for movement between said screens in the spaces between said cellular plastic members, means for admitting into said manifold a premixed cement composition containing a major amount of silica sand, a minor amount of cement and sufficient water to allow the composition to flow through the manifold into the tubes for gravity flow into the mold and means for raising said injector tube assembly at a rate corresponding to the rate the mold is filled.

2. The apparatus according to claim 1 wherein each said injector tube has a length substantially equal to the height of said mold.

3. The apparatus according to claim 1 including means on said mold for indicating the level of the composition in said mold and means on said assembly for indicating the position on the end of said injector tubes in said mold.

4. The apparatus according to claim 1 including means for vibrating said injector tube assembly.

5. The apparatus according to claim 4 including means for vibrating said mold.

6. The apparatus according to claim 1 wherein said injector tube assembly includes an auger positioned in each of said injector tubes and extending into said manifold for moving said cement composition from said manifold into said tubes.

* * * * *